Dec. 6, 1932.  E. W. BRANDT  1,890,175
PROJECTILE HAVING GUIDE TAILS
Filed Dec. 4, 1931   5 Sheets-Sheet 1
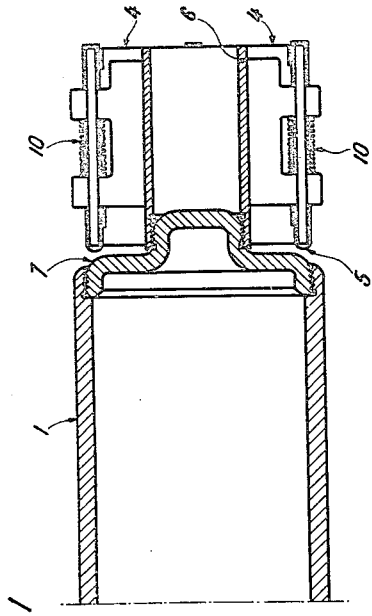
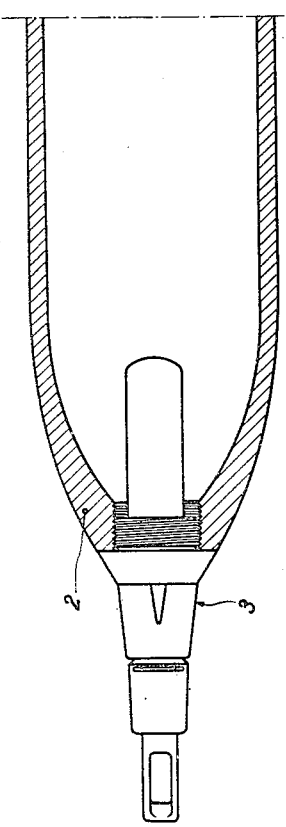
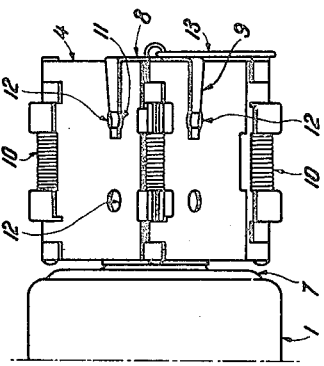
Fig. 2
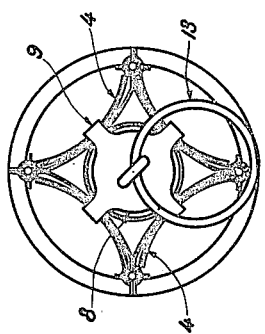
Fig. 3
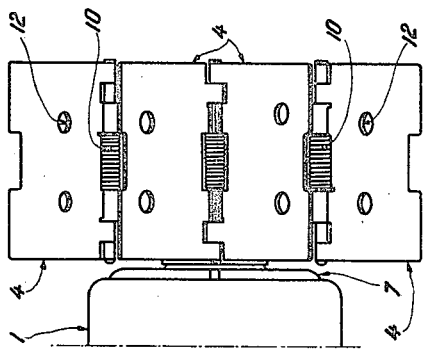
Fig. 4
Inventor:
Edgar W. Brandt,
Attorneys.

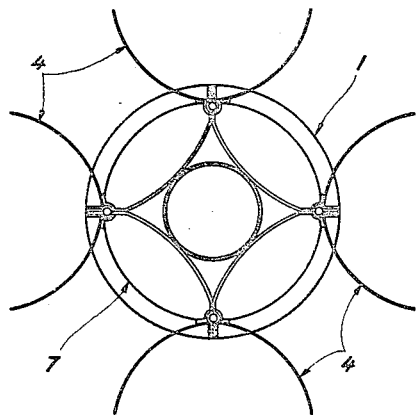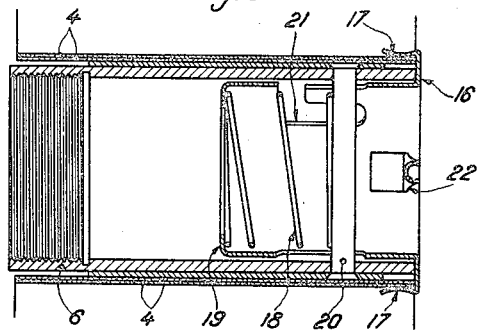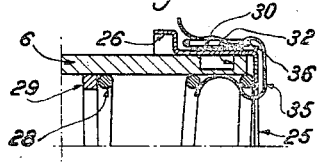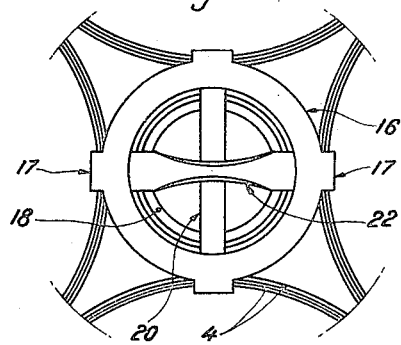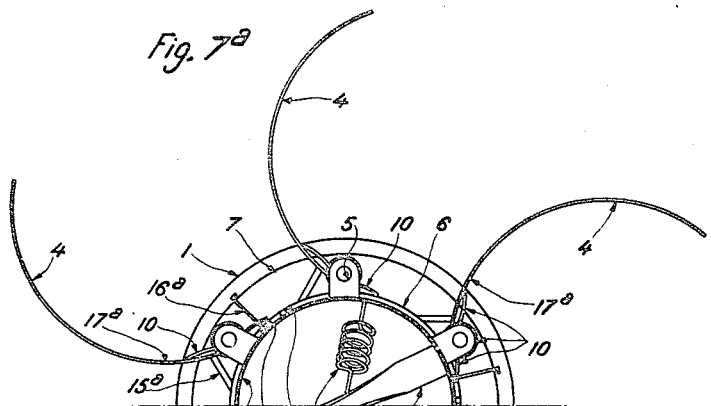

Dec. 6, 1932.  E. W. BRANDT  1,890,175
PROJECTILE HAVING GUIDE TAILS
Filed Dec. 4, 1931  5 Sheets-Sheet 3

Inventor:
Edgar W. Brandt,
Attorneys.

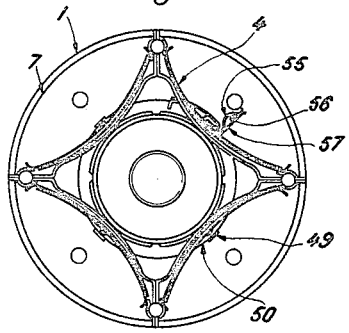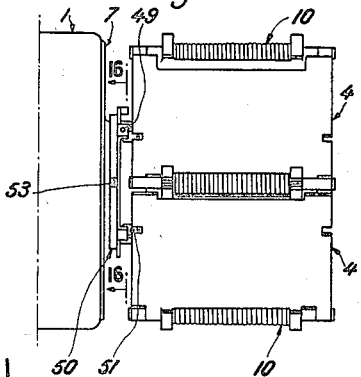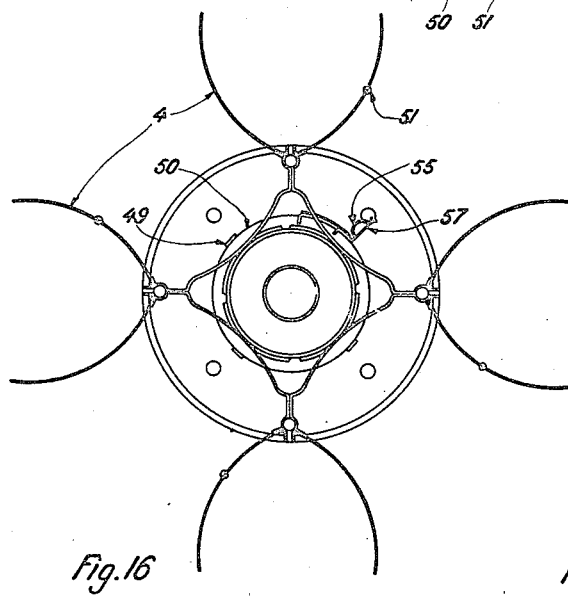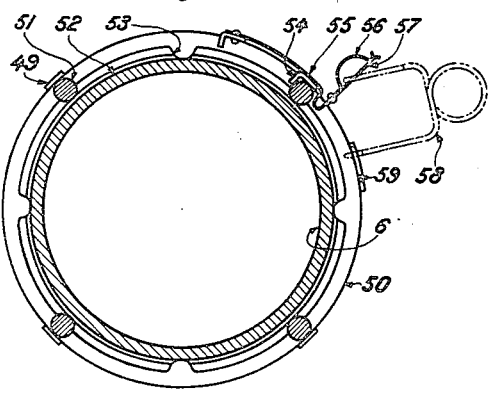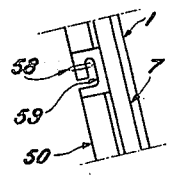

Dec. 6, 1932. E. W. BRANDT 1,890,175
PROJECTILE HAVING GUIDE TAILS
Filed Dec. 4, 1931 5 Sheets-Sheet 5
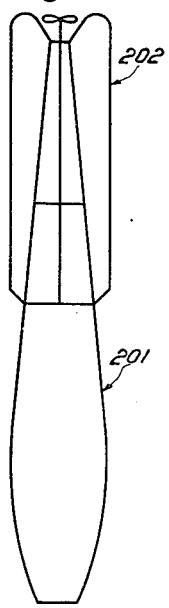
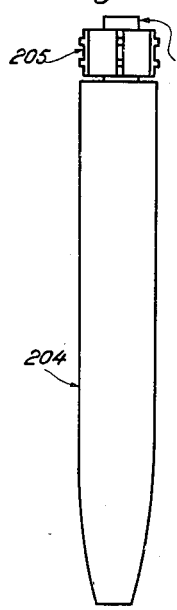
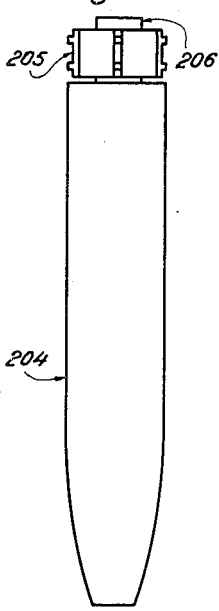
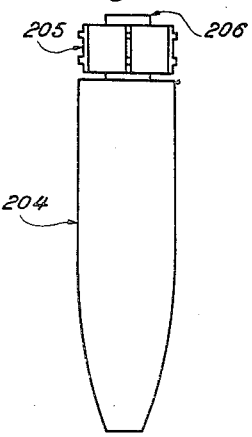
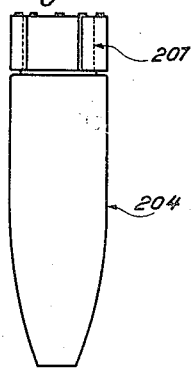
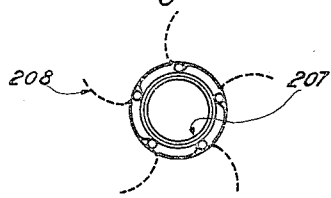
Inventor:
Edgar W. Brandt,
By
Attorneys.

Patented Dec. 6, 1932

1,890,175

UNITED STATES PATENT OFFICE

EDGAR WILLIAM BRANDT, OF PARIS, FRANCE

PROJECTILE HAVING GUIDE TAILS

Application filed December 4, 1931, Serial No. 579,088, and in France January 8, 1931.

The present invention relates to improvements in the projectiles described in my copending application, Serial No. 493,675, filed November 5, 1930. These improvements are more particularly intended for the construction of such projectiles so that they may be utilized as airship bombs.

Further, these improvements particularly show methods of constructing and arranging the latch system for the wings and an especial shape for the rear portion of the projectile which permits its being loaded by a cartridge.

Other advantages and details of the invention will appear in the course of the following specification.

On the accompanying drawings, by way of example only:

Figure 1 is an axial section showing one form of construction of the projectile according to the invention, the wings being shown in folded position.

Figures 2 and 3 are respectively an elevation and an end view of the wing system in folded position.

Figures 4 and 5 are respectively analogous views of the wing system in extended position.

Figure 6 is an axial section and Figure 7 an end view of the modified form of the latching device.

Figure 10 shows a detail on a larger scale.

Figures 13 and 14 are respectively an elevation and an end view of another modification of construction of the wing system, in folded position.

Figure 15 is an end view of the same with the wing system in extended position.

Figure 16 is an elevation of the latching ring, on a larger scale.

Figure 17 is a side view of a detail in Fig. 16.

Figure 18 shows, in elevation, an airship bomb of known type, by way of comparison.

Figure 19 is an analogous view of the bomb according to the present invention, of the same weight, length and diameter.

Figure 20 is an elevation of the modified construction from that of Figure 19, having the same weight and the same length as the bomb in Figure 18, but of lesser diameter.

Figure 21 is an analogous view in another example of bomb according to this invention, having the same length and diameter as the bomb of Figure 18, but having a larger capacity for explosive.

Figures 22 and 23 are respectively a side elevation and an end view of the position taken by the wings, the extended wings being represented in dotted lines.

Figure 7a is a partial end view showing another embodiment of the guide tails.

Figure 9:
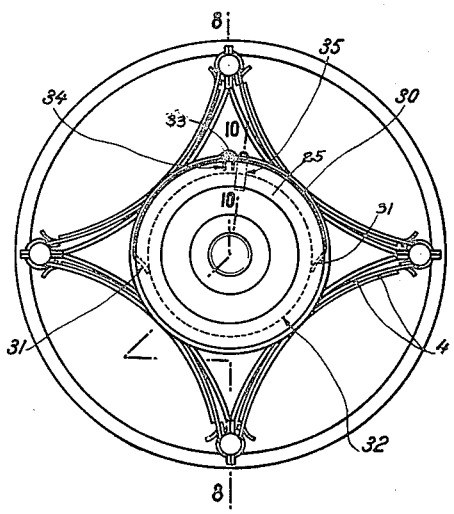
Figures 8 and 9 are respectively an axial section and an end view of another form of execution of the wing system.

In the example of Figures 1 to 5, the bomb comprises a body 1 which preferably is cylindrical and is terminated at the front with an ogive 2 whose walls may advantageously be thickened or otherwise reinforced to increase the resistance to shock. A fuse device 3, fastened either at the front or the rear of the body, provides for explosion of the charge at the desired instant.

The bomb comprises at the rear a movable tail or wing system comprised of wings 4 which are extended by pivoting about axes 5 parallel to the bomb axis, as described in my aforesaid application. In the example shown, this wing system is mounted on a tube 6 threaded or otherwise secured to the base 7 which closes the bomb body at the rear. The base 7 is preferably secured to the body 1 in removable manner, as for example, by screw threads.

The latching system for the wings is formed, in this example, by a removable clamp 8 having a plurality of fingers 9 for retaining the wings 4 in folded position in opposition to the action of their springs 10, as represented in Figure 2.

The fingers 9 of this clamp may comprise, for this purpose, small bosses 11 (Figure 2) which may be engaged in the perforations 12 of the wings 4 for the purpose of assuring the base fastening. A ring 13 serves for withdrawing the clamp 8 after the projectile has been hooked in the bomb dropper. In passing from the latter, the wings 4 are liberated and are extended under the action of springs 10 and assume the position of Figures 4 and 5.

Figures 6 and 7 show a modification of construction in which the latching element remains fixed to the bomb. This element is formed by a cup 16 provided with lugs 17 which retain the wings 4 in folded position. A spring 18 bearing on the one hand on the collar 19 of the cup 16 and on the other hand against the stop pin 20 which is rigid with the tube 6, holds the cup 16 in latching position.

The pin 20 is engaged in bayonet slots 21 of the cup 16 which likewise comprise a cross piece 22 serving as an operating handle.

To liberate the wings, it is sufficient to raise the cup 16 by its handle 22 and then to cause it to rotate to bring its lugs 17 into the free space existing between the wings 4.

An inverse operation permits relatching in case the bomb is not used.

Figure 7a represents another form of construction in which the wings 4 are all extended in the same direction, in the manner of turbine blades. This disposition permits giving the wing system a maximum external diameter when extended and in consequence reduces to a minimum the number of wings needed.

In extended position, the wings 4 abut against stops formed in the present example by tongues 15a cut from the tube 6 and bent outwardly. The lugs 16a which are rigid with the cup 16 are disposed in such manner as to be engaged in holes 17a provided in the wings 4 for retaining them in folded position when the lugs 16a are themselves engaged in the latching holes 18a of the tube 6, which are lower than the unlatching holes 19a. In the present example, the spring 18 is connected on the one hand to the handle 22 and on the other hand to a suitable point at the interior of the tube 6. To effect the unlatching of the wings 4, it is sufficient to raise the cup 16 against the action of the spring 18 and to cause it to turn in such manner as to pass its lugs 16a from the holes 18a into the holes 19a.

It will be seen that this arrangement of the wing system only requires the latching of one wing of each two, the wing 4 at the middle of Figure 7a being, for example, held blocked in its folded position by the wing 4 which is located at its left, and so on.

The great diameter of the wing system as thus used permits attaining a perfect stabilization of the ogivo-cylindrical projectile of the type shown, but this form also has great advantages with respect to the bi-ogival shape generally utilized for airship bombs. Thus, with an equal caliber and length of projectile, it offers a much greater capacity for explosive. Furthermore, its manufacture is more simple and it permits loading by a cartridge. For this purpose it is sufficient to remove the bottom 7 to introduce into the projectile at the desired moment, a cartridge enclosing the particular charge to be utilized against a predetermined objective. The ease and safety of projectiles which may be charged by a cartridge are well known to experts in the art. There may simply be cited the possibility of storing the empty bombs and protecting them consequently from risk of bombardment and destruction.

Figure 8:
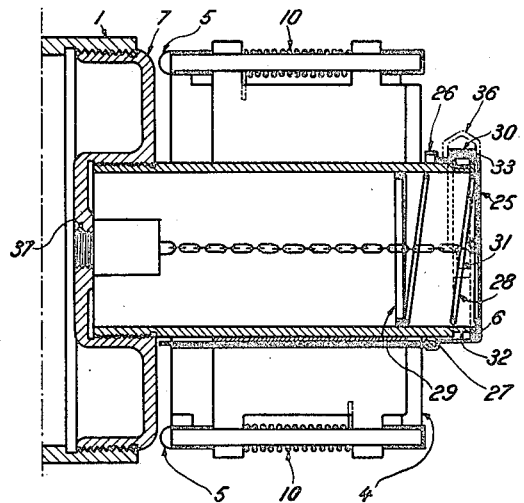

In the example of construction shown in Figures 8 to 10, the wings 4 are maintained in folded position by a latching cap 25 provided with a collar 26 under which are engaged the projecting portions 27 of the wings 4. The spring 28 or other elastic element bears against a ring 29 which is rigid with the tube 6 and tends to push the latching cap 25; this movement is prevented by a detent element constituted, for example, of the blade spring 30 having lugs 31 which engage in a groove 32 of the tube 6. Any displacements of the spring 30 in a longitudinal direction is, further, prevented by a rider 33 (Figures 8 and 9) whose lugs 34 are located in the same groove 32. A safety spring or hook 35 (Figure 10) serves for holding the spring 30 immobile during transport and manipulation. A ring 36 (Figure 8) serves for pulling off the spring 30 at the moment of firing or dropping, either by hand or under the action of a traction by a cord or rope, from a distance. The latching cap 25 is then pushed by the spring 28 and the wings 4 are extended under the action of their control springs 10. This displacement permits placing a breech fuse in the threaded aperture 37.

For this purpose there may be employed with advantage a fuse of the type described in my French Patent No. 724,208, showing an inertia percussion fuse with variable safety devices.

In such case, the chain serving for removing the unlatching hook of the fuse may be connected, for example, to the cap 25. In this manner, the expulsion of the cap 25 by spring 28 at the moment of discharging the bomb, produces at the same time the extraction of the unlatching hook and the arming of the fuse.

Figure 12:
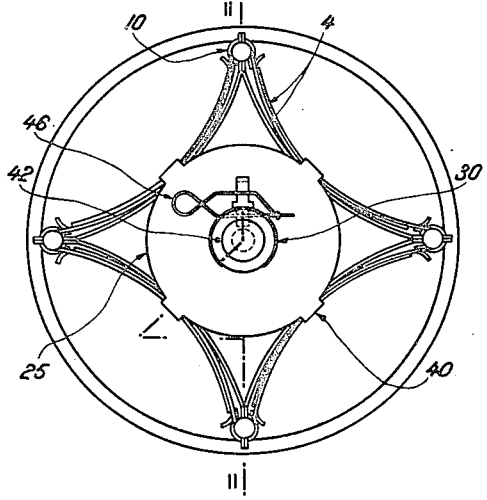
Figures 11 and 12 are respectively an axial section and an end view of a still further modification of the wing system.
Figure 11:
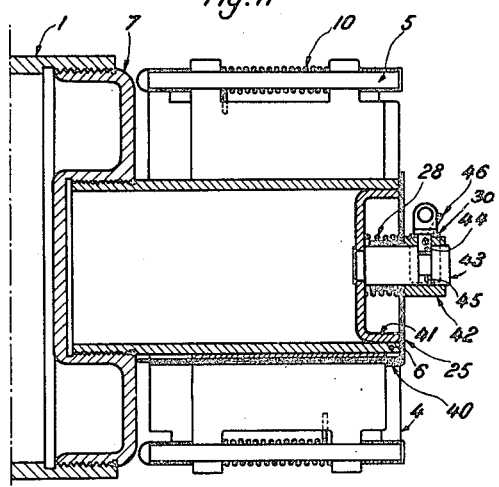

Figures 11 and 12 show a modification relating in particular to the case where an ogival or nose fuse is to be employed.

The wings 4 are held in folded position by lugs 40 and the projecting portions of the latching cap 25. A spring 18, bearing against a cup 41, this is rigid with the tube 6 tends to expel the cap 25; this movement is prevented by the ring 42 mounted on a stem 43 which is rigid with the cup 41. A spur 44 passes through the ring 42 and is engaged in a groove 45 of the stem 43 in such manner as to key the ring 42 in blocking position.

A suitable detent formed for example by a blade spring 30 (Figure 12) through which the spur 44 passes and which itself embraces the ring 42 serves for elastically holding the spur 44 in position. Further, a removable safety pin 46 is provided for locking the spur 44 on the ring 42 during the transport. This pin is removed after hooking the projectile in the bomb dropper.

At the moment of dropping, the spur 44 is torn away; the ring 42 and the cap 25 are pushed by the spring 28, and the wings 4 are unlatched and are extended under the action of springs 10 (Figure 12).

In the example of Figures 13 to 17, the wings 4 are constructed and arranged to be held in folded position by lugs 49 of the latching ring 50 which holds the projections 51 immobile, these projections being rigid with the wings 4 (Figures 13 and 14). The ring 50 may turn in a groove 52 of the tube 6, on which it is supported preferably by bosses 53, Figure 16. It is held immobile by an abutment 54 and by a spring 55 fastened on in such manner as to hold one or more projections 51 of the wings 4. This spring 55 ends preferably in a loop 56 closes for example by means of a blade 57 connected to it.

The unlatching of the wings 4 is effected by an actuating spring 55 by aid preferably of a control ring (not shown) engaged in the loop formed by the springs 55 and 57. The attraction exerted causes deformation of the spring 55 and rotation of the ring 50 whose lugs 49 then permit the projections 51 of wings 4 to escape, and the wings are then extended under the action of their springs 10 (Figure 15). The control ring escapes after unlatching, by separating the ends of springs 55 and 57.

During transport, the movement of ring 50 is prevented by an elastic hook 58 or other safety element which is removed after fastening the bomb in the bomb dropper and before placing the control ring in position in the loop of springs 55 and 57. In the illustrated example, the hook 58 is engaged on the one hand in the loop 56 and on the other hand in the bayonet slot 59 of ring 50 (Figure 17).

The various forms of construction shown assure a simple and safe latching of the tail system, in such manner that the latter remains in folded condition, and does not interfere with handling during the transport or fastening in the bomb dropper. Further, it is thus protected from any damage in case of falling or accidental shock.

Figures 19 to 23 show various constructions of bombs according to the invention and demonstrate their advantages with respect to known bombs such as that represented in Figure 18.

This latter comprises a body 201 of ogival form about the front and truncated form at the rear. Fixed wings 202 are seated on the rear portion for stabilizing the bomb on its trajectory. The external diameter of the fixed wings does not exceed the greatest diameter of the bomb proper. Their height thus amounts to almost half the total length of the bomb (not including the fuse).

The bombs of this type have the difficulty of being a great incumbrance on the airship where the space occupied must be reduced to the minimum. The ratio of total volume of the bomb with respect to the volume of the housing for receiving it is very small. Further, their profile is not adapted for easy handling nor for fastening or maintenance in the bomb dropper. Finally, the difficulties inherent in the employment of fixed wing systems, both from the point of view of their aerodynamic efficiency and their fragility, are well known to experts in the art and have also been set forth in detail in the first aforesaid application.

The bombs represented in Figures 19 to 21 eliminate these difficulties and permit utilizing to a maximum the transport capacity of the airship in which they are placed.

They represent an ogival-cylindrical body 204 at the rear of which is suitably seated an extensible wing system 205 having preferably the form of one or the other of the constructions represented in Figures 1 to 17 and in the first aforesaid application.

The latching cap 206 holds the wings in folded position during transport and manipulation.

In the example of Figure 19, the ratio between the height of the extensible wing system and the total length of the bomb (not including the fuse) does not exceed 1:6. Nevertheless, the aerodynamic action of the extensible wing system is such as to attain a perfect stabilization of the projectile on its trajectory. The combination of this wing system with the ogival-cylindrical body permits attaining a stabilized bomb with a great explosive capacity, whose height is considerably less than that of former bombs as will be immediately seen by comparison of Figures 18 and 19.

In the forms of Figures 20 and 21, the ratio of the height of the wing system to the total length of the bomb is about 1:9, Figure 20. With an equal weight, the bomb according to this invention may be made of a considerable less diameter than that of the bomb of Figure 18 and permits, consequently, of economizing width in the carrier or bomb rack, and of holding more bombs in the carrier of given width. Figure 21 shows that for the same encumbrance, the ogival-cylindrical bomb represented may hold a considerable larger quantity of the explosive than the projectile of Figure 18.

The ratio between the height of the wing system and the total length of the bomb may vary according to this invention between 1:5 and 1:10 (and even a lesser value) according to the type of bomb dropper employed, as the extensible wing system utilized assures in all cases a perfect stabilization of the projectile on its trajectory.

In another form of construction (Figures 22 and 23) the extensible wing system is mounted on the rear periphery of the projectile body 204 whose walls are suitably cut away for this purpose, as represented at 207.

Preferably, wings 208 are employed which are all extended in the same direction, in the manner of turbine blades, in such manner that the wing system occupies the least possible space in folded position. This disposition permits totally eliminating the projection of the wing system at the rear of the breech or base of the projectile and consequently of attaining a stabilized bomb having a maximum capacity for explosive with given dimensions.

It will be well understood that wings may be employed in like manner which extend rearwardly by pivoting about the axis at right angles to the angles of the projection as described in my first aforesaid application. In this case, the wings in question will have preferably the form of portions of a cylinder so that they adapt themselves to the contour of the rear portion of the projectile which is suitably cut away to receive them.

Naturally, the forms of execution shown and described have only been selected by way of example; numerous modifications in detail may be employed without departing from the scope of the present invention and the appended claims.

What is claimed:

1. Projectile comprising a body, an extension on the rear of said body, a plurality of wings secured to said extension and movable between a folded position surrounding said extension in which they are of lesser diameter than said body and an extended position in which they extend beyond said body, and a removable latching clamp located at the free end of said extension and including a plurality of fingers extending over and engaging the wings and holding them in folded position.

2. Projectile comprising a body, a hollow extension on the rear of said body, a plurality of wings secured to said extension and movable between a folded position surrounding said extension in which they are of lesser diameter than said body and an extended position in which they extend beyond said body, a sleeve slidable in said extension and having at least one out-turned and rebent portion for engaging and holding the wings in folded position, and a releasing device connected to said sleeve whereby to withdraw said portion from engagement with said wings.

3. Projectile comprising a body, a hollow extension on the rear of said body, a plurality of wings secured to said extension and movable between a folded position surrounding said extension in which they are of lesser diameter than said body and an extended position in which they extend beyond said body, a sleeve slidable in said extension and having at least one out-turned and rebent portion for engaging and holding the wings in folded position, a spring for forcing the wings outwardly into extended position, a radially inward extending member in the hollow extension, said sleeve having a bayonet slot engaged by said member whereby said sleeve in one position is held against axial movement in said extension and said portion engages and holds at least one wing in folded position, and whereby said sleeve upon rotation about the axis of said extension is free for movement by said spring to release said portion from said wing.

4. Projectile comprising a body, an extension on the rear of said body, a plurality of wings secured to said extension and movable between a folded position surrounding said extension in which they are of lesser diameter than said body and an extended position in which they extend beyond said body, a cup covering the free end of said extension and engaging over said wings for holding them in folded position, a safety element removably engaged with said cup and said extension, and a spring for moving said cup out of engaging position when said safety element has been removed.

5. Projectile comprising a body, an extension on the rear of said body, a plurality of wings secured to said extension and movable between a folded position surrounding said extension in which they are of lesser diameter than said body and an extended position in which they extend beyond said body, a cup covering the free end of said extension and engaging over said wings for holding them in folded position, a safety element removably engaged with said cup and said extension, a spring for moving said cup out of engaging position when said safety element has been removed, said extension having a peripheral groove therein, and a safety device including a loose spring member embracing said cup opposite said groove and having inward extensions projecting through said cup wall into the groove to prevent movement of said cup.

6. Projectile comprising a body, an extension on the rear of said body, a plurality of wings secured to said extension and movable between a folded position surrounding said extension in which they are of lesser diameter than said body and an extended position in which they extend beyond said body, a cup covering the free end of said extension and engaging over said wings for holding them in folded position, a safety element removably engaged with said cup and said extension, a spring for moving said cup out of engaging position when said safety element has been removed, said extension having a peripheral groove therein, a loose spring member embracing said cup opposite the groove and having its ends extending inwardly through the cup wall into said groove, and a rider over an intermediate portion of said spring member and having its ends projecting through the cup wall into said groove.

7. Projectile comprising a body, a hollow extension on the rear of said body, a plurality of wings secured to said extension and movable between a folded position surrounding said extension in which they are of lesser diameter than said body and an extended position in which they extend beyond said body, a spring in said extension, a device engaging the outer sides of the wings while in folded position and operable by said spring to disengage said wings, a safety device including a loose spring engaged with said latching means and said extension, and a second safety element engaging within the extension and passing through the cup and over the outside of said spring member.

8. An airplane bomb for dropping from a bomb-carrier, comprising a body, an extension on the rear of said body, a plurality of wings secured to said extension and movable between a folded position surrounding said extension in which they are of lesser diameter than said body and an extended position in which they extend beyond said body, latching means for holding the wings in folded position, a releasing device connected to said means and adapted to be connected to said carrier whereby the latching means is disengaged when the bomb is dropped from said carrier, a spring for disengaging said latching means when said releasing device is removed therefrom, a fuse including a removable safety device, and means for connecting said releasing and fuse safety devices so that the wings are released and the fuse is armed upon the dropping of the bomb.

9. Projectile comprising a body, a plurality of wings pivotally connected to said body and movable between folded and extended position, means for moving said wings into extended position, a latching cap for holding the wings in folded position, a blocking ring for retaining said cap in holding position and secured to said body, and means including a removable hook for maintaining said ring in position on said body.

10. Projectile as in claim 9, in which said body has a peripheral groove therein and a removable safety pin extends through said ring and groove for holding said hook and ring in position during transport.

11. Projectile comprising a body, an extension on the rear of said body, a plurality of wings secured to said extension and movable between a folded position surrounding said extension in which they are of lesser diameter than said body and an extended position in which they extend beyond said body, a ring including means for holding the wings in folded position, said extension having a groove in which said ring is mounted, and a removable abutment on said ring for maintaining the same in position for holding the wings folded, said ring being movable in said groove into a wing releasing position upon removal of the abutment.

12. Projectile as in claim 11, in which said removable abutment comprises a blade spring having a loop, and a control ring is engaged in said loop for moving the ring peripherally in said groove.

13. Projectile comprising a hollow charge-receiving body and an extension at the base of said body of lesser diameter than the body, pivots mounted on the extension parallel to the axis of the projectile, a plurality of stabilizing wings articulated on the pivots and movable therearound between folded and extended positions, said wings having between one fifth and one tenth of the total length of the projectile.

In testimony whereof, I affix my signature.

EDGAR WILLIAM BRANDT.